(12) United States Patent
Hino

(10) Patent No.: US 7,268,902 B2
(45) Date of Patent: Sep. 11, 2007

(54) IMAGE PROCESSING APPARATUS, IMAGE PROCESSING METHOD, AND PROGRAM

(75) Inventor: Yasuhiro Hino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 947 days.

(21) Appl. No.: 09/947,712

(22) Filed: Sep. 7, 2001

(65) Prior Publication Data

US 2002/0035582 A1 Mar. 21, 2002

(30) Foreign Application Priority Data

Sep. 12, 2000 (JP) ............................. 2000-275951

(51) Int. Cl.
*G06F 15/00* (2006.01)
(52) U.S. Cl. ..................... 358/1.15; 358/1.2; 358/1.13; 358/1.6
(58) Field of Classification Search ............... 358/1.15, 358/1.9; 709/217, 218, 203; 382/311; 399/8, 399/10, 81; 347/106, 101; 715/517
See application file for complete search history.

(56) References Cited

U.S. PATENT DOCUMENTS 6,184,996 B1 * 2/2001 Gase .......................... 358/1.15
6,738,155 B1 * 5/2004 Rosenlund et al. ......... 358/1.15
6,738,841 B1 * 5/2004 Wolff ........................... 710/62
6,904,185 B1 * 6/2005 Wilkins et al. ............. 382/311
2002/0194302 A1* 12/2002 Blumberg ................... 709/217

FOREIGN PATENT DOCUMENTS

| JP | 10-275064 | 10/1998 |
| JP | 11-143670 | 5/1999 |

OTHER PUBLICATIONS

Shinji Shimojo, "UNIX Organization of Multimedia 33 Multimedia-Scenario Descriptive Language SMIL", UNIX Magazine, vol. 13-7, ASCII, pp. 40-45.

* cited by examiner

*Primary Examiner*—King Y. Poon
*Assistant Examiner*—Saeid Ebrahimi
(74) *Attorney, Agent, or Firm*—Fitzpatrick, Cella, Harper & Scinto

(57) ABSTRACT

To collect optimal data to an image processing capacity of an output section in an image processing apparatus. Therefore, a method of the present invention includes the steps of: selecting a resource from among conditional branch resources linked in analyzed document information on the basis of an image processing capacity value of a printer engine; and acquiring the selected resource from a server device, analyzing link information in the document information described in the structured description language.

18 Claims, 16 Drawing Sheets

GET http://myserver.com/resources?resol=600 HTTP/1.0

```
GET http://myserver.com/resources?colormode=fullcolor HTTP/1.0
```

```
<extended xml:link="extended" inline="ture"
                                   role="colormode">
<locator xml:link="locator" role="monochrome"
         href="http://myserver.com/mono.jpg"/>
<locator xml:link="locator" role="fullcolor"
         href="http://myserver.com/color.jpg"/>
</extended>
```

FIG. 19

MEMORY MAP OF MEM MEDIUM
(FD/CD-ROM)

| DIRECTORY |
| --- |
| 1ST DATA PROCESSING PROGRAM<br>PROGRAM CODES FOR FLOWCHART OF FIG.7 |
| 2ND DATA PROCESSING PROGRAM<br>PROGRAM CODES FOR FLOWCHART OF FIG.8 |
| 3RD DATA PROCESSING PROGRAM<br>PROGRAM CODES FOR FLOWCHART OF FIG.9 |
| 4TH DATA PROCESSING PROGRAM<br>PROGRAM CODES FOR FLOWCHART OF FIG.10 |
| 5TH DATA PROCESSING PROGRAM<br>PROGRAM CODES FOR FLOWCHART OF FIG.12 |
| 6TH DATA PROCESSING PROGRAM<br>PROGRAM CODES FOR FLOWCHART OF FIG.14 |
| 7TH DATA PROCESSING PROGRAM<br>PROGRAM CODES FOR FLOWCHART OF FIG.15 |
|  |

IMAGE PROCESSING APPARATUS, IMAGE PROCESSING METHOD, AND PROGRAM

BACKGROUND OF THE INVENTION

1. Field of the Invention

The present invention relates to an image processing apparatus for processing the document information described in a structured description language by making the communication with arbitrary server device, a server device that can communicate with the image processing apparatus, and an image processing method.

2. Related Background Art

In recent years, the rapid spread of the personal computers and the Internet has promoted the electronic documentation in every business field. However, since the data format of the electronic document depends on an application program for editing the document, it was required for each user to prepare the application program supporting the data format of the electronic document, in order to circulate the electronic document among many people. Thus, the document described in the structured description language not dependent on a specific application such as the HTML (Hyper Text Markup Language), SGML (Standard Generalized Markup Language), or XML (eXtensible Markup Language) has been spotlighted.

SUMMARY OF THE INVENTION

Since the document data described in the structured description language does not depend on the specific platform, it can be theoretically represented (displayed) on arbitrary device. However, it is generally presupposed that the document data is displayed on the display device.

The display device and the printing apparatus are different in the resolution and color reproducibility. Therefore, if the document data is created to be displayed on the display device, there is the problem that the printing is performed without bringing out the performance of the printing apparatus, when the document data is directly printed by the printing apparatus.

For example, the typical display has a resolution of 72 dpi, while the typical printing apparatus has a resolution of 600 dpi. Therefore, if the document data is printed, the image portion in the document is printed as a coarse image.

FIG. 20 is a view showing a display state where a document based on the document data is displayed on the ordinary display device. In this case, the typical display device has a resolution of 72 dpi. Reference numeral 9a in FIG. 20 denotes an image displayed on the basis of the image data linked in the document data.

FIG. 21 is a view showing a printed result when the document based on the document data is printed by the typical printing apparatus. This corresponds to the printed result when the same document data of FIG. 20 is directly printed. In FIG. 21, reference numeral 10a denotes an image printed on the basis of the image data linked in the document data.

As shown in this example, FIGS. 20 and 21 show the results when the same document data described in the structured description language is processed, in which there is the problem that the image 10a seems to be poorer in quality than the image 9a, owing to a difference between the display resolution and the print resolution (the straight line looks like the zigzag line).

Thus, the present invention employs a link function of the structure description language. The structured description language has typically the link function. By employing this link function, a document component (resource) can be stored in another file. Examples of resource may include the image data and graphic data stored in another file.

The link function has the advantages of allowing the size of the document itself to be reduced and the resource to be shared among a plurality of documents. In the structured description language, a tag for designating the storage location of the resource is called a locator, and the resource stored in another file can be commonly identified by an URI (Uniform Resource Identifier).

In the HTML, the locator can specify only one resource. That is, the link is one-to-one correspondence. However, in the XML, one locator can designate a plurality of resources by employing a function of an extended link, or the link can be one-to-many correspondence.

In order to solve the above-mentioned problems, according to the present invention, a suitable resource is selected from among the conditional branch resources linked in the document information to be analyzed on the basis of an image processing capacity value of output means, and the selected resource is acquired from any of the server devices, whereby a resource optimal to an output capacity of output means can be collected on the image processing apparatus side without increasing the resource selection processing load on the server device side, and the document information and the image information linked from the document information can be output in high quality by making the best use of the capacity of the output means.

Also, according to the present invention, an image processing capacity value of output means and the link information obtained by analysis are notified to any of the server devices, and the selected resource is acquired in the notified server device, whereby a resource optimal to an output capacity of the output means can be collected on the image processing apparatus side without increasing the resource selection processing load on the image processing apparatus side, and the document information and the image information linked from the document information can be output in high quality by making the best use of the capacity of the output means.

Further, according to the present invention, in a state of storing and managing the image information specified in a conditional branch resource linked in the document information described in a predetermined structured description language, the link information acquired from the image processing apparatus is analyzed, the image information that is stored and managed is selected, and the selected image information is read and sent to the requesting image processing apparatus, whereby a resource optimal to an output capacity of the output means on the image processing apparatus side can be collected without increasing the resource selection processing load on the server device side, and the document information and the image information linked from the document information can be sent in high quality to the image processing apparatus by making the best use of the capacity of the output means.

Further, according to the present invention, in a state of storing and managing the image information specified in a conditional branch resource linked in the document information described in a predetermined structured description language, the link information acquired from the image processing apparatus and an capacity information value of output means are analyzed, the image information that is stored and managed is selected, the selected image information is read and sent to the requesting image processing apparatus, whereby a resource optimal to an output capacity of the output means on the image processing apparatus side can be collected, and the document information and the image information linked from the document information can be sent in high quality to the image processing apparatus by making the best use of the capacity of the output means.

BRIEF DESCRIPTION OF THE DRAWINGS

FIG. 19 is a diagram for explaining a memory map of a storage medium storing various kinds of data processing programs;

DETAILED DESCRIPTION OF THE PREFERRED EMBODIMENTS

First Embodiment

Before explaining a configuration of a first embodiment, a constitution of a laser beam printer (LBP) that is suitable for applying this embodiment will be described below by reference to FIG. 1. The printer applied in this embodiment is not limited to the laser beam printer, but needless to say, may be a printer of other printing method. This first embodiment will be described below in detail by reference to the accompanying drawings.

Figure 1:
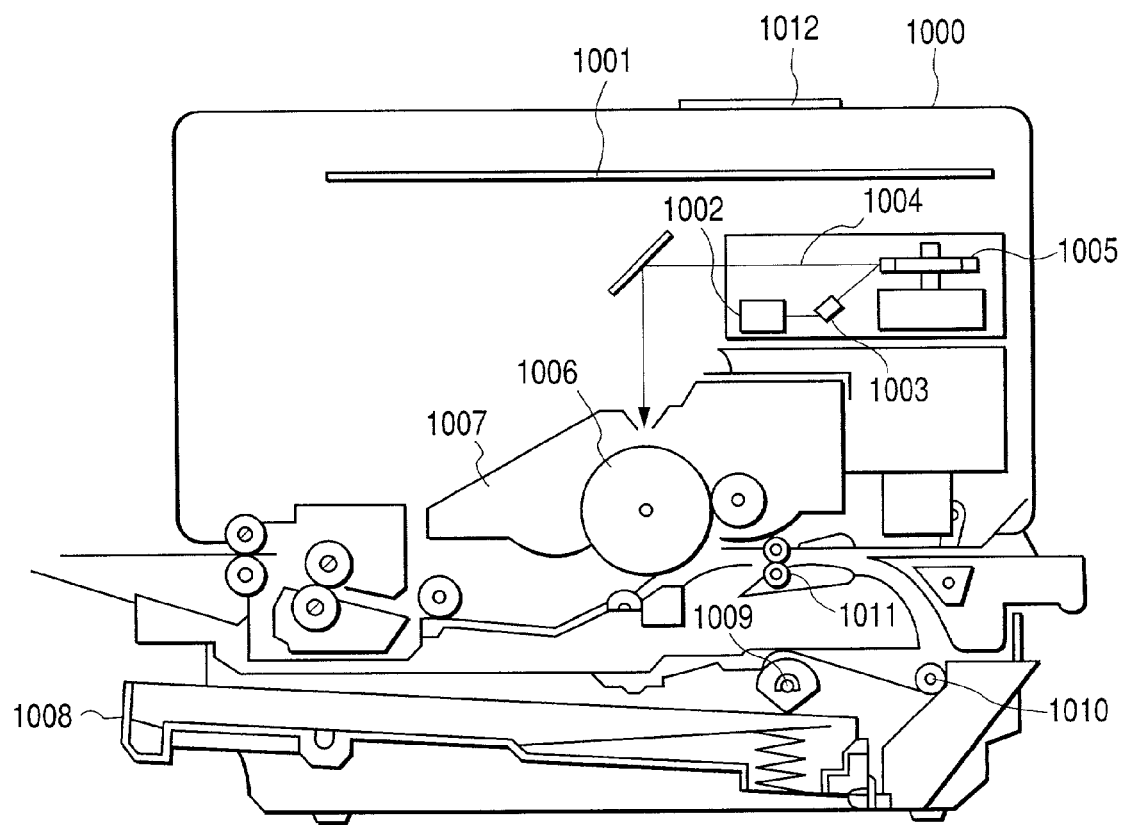
FIG. 1 is a cross-sectional view showing an internal structure of a laser beam printer.

FIG. 1 is a cross-sectional view showing an internal structure of the laser beam printer that is applied in this embodiment. This laser beam printer allows the registration of character pattern or fixed format (form data) from a data source, not shown. The data source is, for example, a host computer connected via a network.

In FIG. 1, reference numeral 1000 denotes an LBP main body (hereinafter referred to as a printer), which accepts and memorizes the character information (character code), the form information, or a macro instruction that is supplied from the host computer connected to the outside, produces the corresponding character pattern or form pattern in accordance with the character or form information to print the images on the recording sheet that is the recording medium.

Reference numeral 1012 denotes an operation panel on which the switches and the LED indicators are disposed. Reference numeral 1001 denotes a printer control unit for making control of the printer 1000 as a whole and the analysis of character information supplied from the host computer. This printer control unit 1001 mainly converts the character information into a video signal of corresponding character pattern to be output to a laser driver 1002. The laser driver 1002 is a circuit for driving a semiconductor laser 1003 to switch on or off a laser beam 1004 emitted from the semiconductor laser 1003 in accordance with the input video signal. The laser beam 1004 is swung left and right by a rotational polygon mirror 1005 to scan over an electrostatic drum 1006.

Thereby, an electrostatic latent image of character pattern is formed on the electrostatic drum 1006. This latent image is developed by a developing unit 1007 around the electrostatic drum 1006, and then transferred onto the recording sheet. This recording sheet employs a cut sheet, in which the cut recording sheet is stored within a paper cassette 1008 attached in the printer 1000, taken into the apparatus by a paper feed roller 1009 and the conveying rollers 1010, 1011 and supplied to the electrostatic drum 1006.

Figure 2:
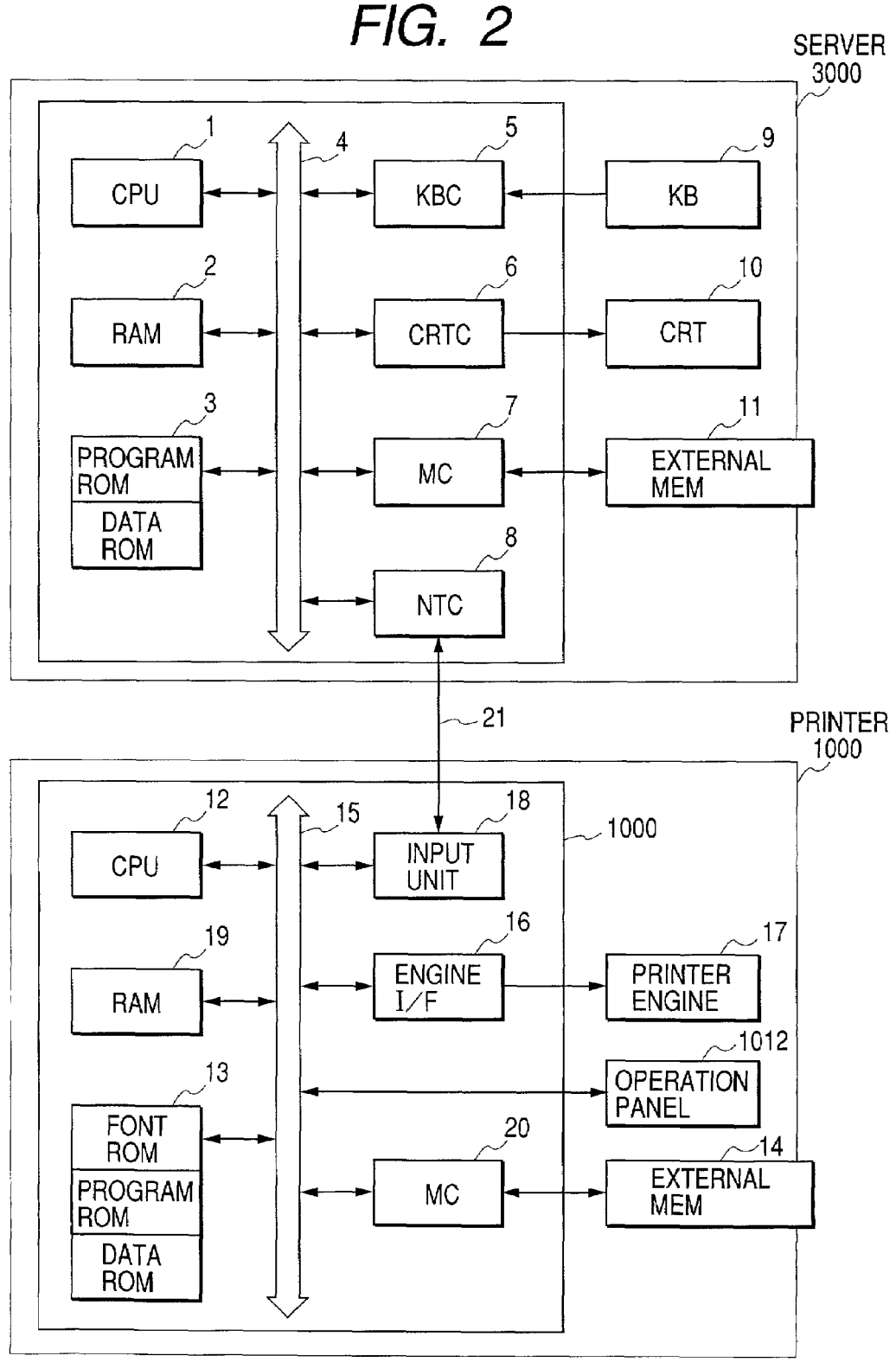
FIG. 2 is a block diagram showing a configuration of a printer control system.

FIG. 2 is a block diagram for explaining the configuration of a printing system showing the embodiment of the present invention. In this embodiment, the printing system employs the laser beam printer (FIG. 1). Note that the invention may be applicable to the system consisting of a single device or a plurality of devices, or the system via the network such as LAN, so far as the functions of the invention can be performed.

In FIG. 2, reference numeral 3000 denotes a server computer having a CPU 1. The CPU 1 performs the reading of document data or the data conversion in accordance with a document processing program stored in a program ROM of a ROM 3. Also, the CPU 1 generically controls each device connected to a system bus 4. The program ROM of the ROM 3 stores the control program for the CPU 1, a font ROM of the ROM 3 stores the font data for use in the data conversion process, and a data ROM of the ROM 3 stores various sorts of data for use in data conversion process.

A RAM 2 functions as a main memory or work area for the CPU 1. A keyboard controller (KBC) 5 controls the key input from a keyboard (KB) 9 or a pointing device, not shown. A CRT controller (CRTC) 6 controls the display of a CRT display (CRT) 10.

In this embodiment, the keyboard 9 or the CRT display 10 is not necessarily required, but usually is provided to make maintenance of a server computer 3000 or confirm its operation condition.

A memory controller (MC) 7 controls the access to an external memory 11 such as a hard disk (HD) or a floppy disk (FD) for storing a boot program, various sorts of applications, font data, a user file, and an edit file.

A network controller (NTC) 8 is connected via a predetermined bi-directional interface 21 to the printer 1000 and controls the communications with the printer 1000. The CPU 1 controls the memory controller 7 to take out the document data stored in the external memory 11, or controls the network controller 8 to transfer the document data to the outside, for example.

The printer 1000 has a printer CPU 12. The printer CPU 12 generically controls the access to various sorts of devices connected to the system bus 15 in accordance with the control program stored in the program ROM of the ROM 13 or the control program stored in the external memory 14 to output an image signal as the output information to a printer engine 17 connected via a printer engine interface 16.

Also, the program ROM of the ROM 13 may store the control program for the CPU 12 as shown in a flowchart as will be set forth later.

The font ROM of the ROM 13 stores the font data for use in producing the output information, and the data ROM of the ROM 13 stores the information for use on the host computer 3000, when the printer is not provided with the external memory 14 such as hard disk.

The CPU 12 can communicate via an input section 18 with the host computer, and inform the information within the printer to the host computer 3000.

A RAM 19 functions as a main memory or a work area for the CPU 12. The RAM 19 allows the memory capacity to be extended by employing an option RAM connected into an extension port.

The RAM 19 is used for an output information expanding area, an environmental data storage area, and NVRAM. The external memory 14 such as the hard disk (HD) or an IC card is accessed under control by a memory controller (MC) 20. The external memory 14 is connected as an option to store the document data, the font data and the form data.

The operation panel 1012 is equipped with the operation switches and the LED indicators.

At least one external memory may be equipped, and a plurality of external memories may store the built-in font, an optional font card, a program for interpreting the printer control language of different language scheme. Further, the NVRAM, not shown, may be provided, and the printer mode setting information from the operation panel 1012 may be stored.

Figure 3:
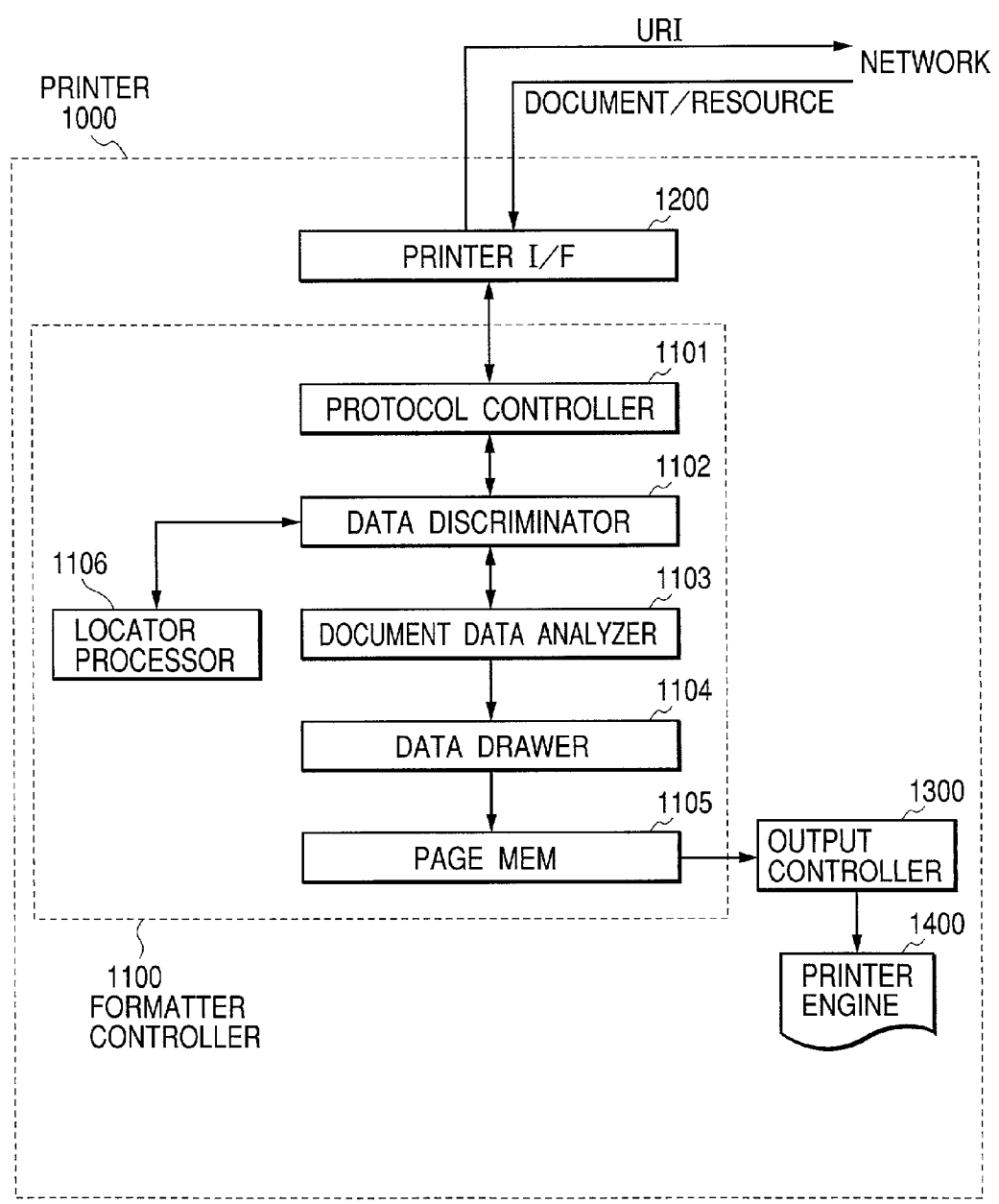
FIG. 3 is a block diagram showing a data processing configuration in a print control device.

FIG. 3 is a block diagram showing the functional configuration of the print control device. In FIG. 3, the printer 1000 is roughly composed of a formatter controller 1100, a printer interface 1200, an output controller 1300, and a printer engine 1400.

The formatter controller 1100 is composed of a protocol controller 1101, a data discriminator 1102, a document data analyzer 1103, a data drawer 1104, a page memory 1105, and a locator processor 1106.

The printer interface (printer I/F) 1200 has a function for making the input or output into or from the outside. The protocol controller 1101 has a function for making the communications with the outside by analyzing and transmitting a network protocol. For example, when the HTTP (Hyper Text Transfer Protocol) is used, it acquires the document indicated by the URI or transmits the information to the Web server.

The data discriminator 1102 has a function for identifying and discriminating the locator in the structured document.

The data discriminator 1102 delivers the data for locator portion to the locator processor 1106, or delivers the data other than the locator to the document data analyzer 1103.

The locator processor 1106 extracts the necessary information from a group of locator tags and communicates through the protocol controller 1101 with the outside in accordance with the extracted information. The document data analyzer 1103 has a function for analyzing the document data described in the structured description language and converting it into the intermediate code that is in an easily processible format. The intermediate code generated in the document data analyzer 1103 is passed to the data drawer 1104 and processed.

The data drawer 1104 expands the intermediate data into the bit map data, and the expanded bit map data is drawn successively in the page memory 1105. In general, the formatter controller 1100 is a computer system composed of CPU, ROM and RAM. For example, the CPU performs a control program stored in the ROM or RAM, the formatter controller 1100 is provided.

An output controller 1300 converts the content of the page memory 1105 into a video signal, and transfers the image to the printer engine 1400. The printer engine 1400 is a printing mechanism for forming a permanent visible image on the recording sheet in accordance with the video signal received.

Figure 4:
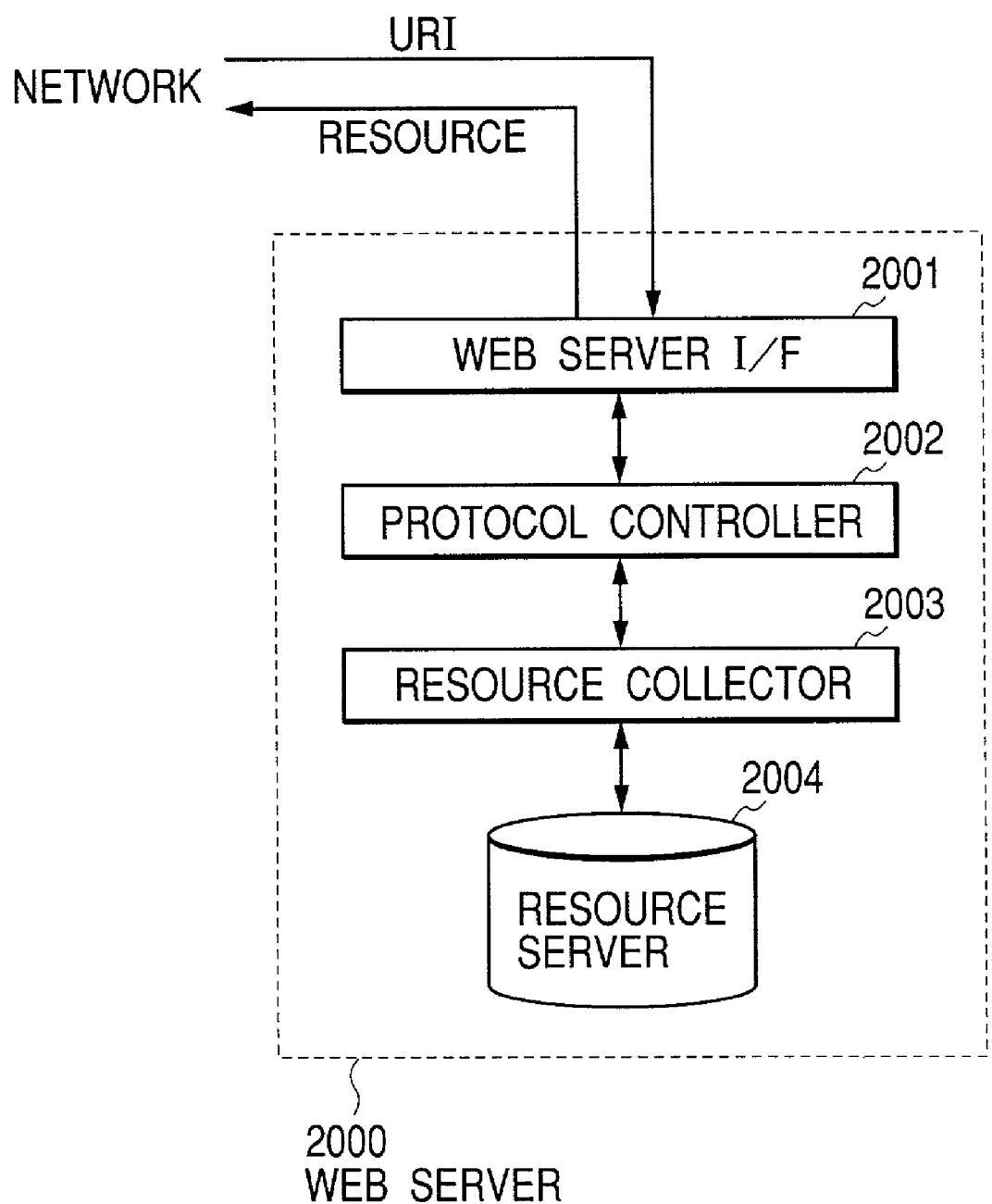
FIG. 4 is a block diagram showing a configuration of a Web server that is communicable with the print control device.

FIG. 4 is a block diagram showing the functional configuration of a Web server that can communicate with the print controller of the invention. In FIG. 4, the Web server 2000 is roughly composed of a Web server interface 2001, a protocol controller 2002, a resource collector 2003, and a resource server 2004.

The Web server interface 2001 has a function for making the input or output into or from the outside. The protocol controller 2002 has a function for making the communications with the outside by analyzing and transmitting a network protocol. For example, when the HTTP is used for the protocol, it receives the information and transmits the document or resource indicated by the URI.

The resource collector 2003 acquires the designated resource from the resource server 2004. The resource server 2004 stores a resource file of the document described in the structured description language.

If receiving the URI from the printer 1000, the Web server 2000 takes out the resource designated by the URI from the resource server 2004, and transmits the resource to the printer 1000 in the protocol communication. A network such as the Internet is employed to connect between the printer 1000 and the Web server 2000.

A specific example of the locator in the structured description language will be set forth by reference to FIGS. 5 and 6.

Figure 5:
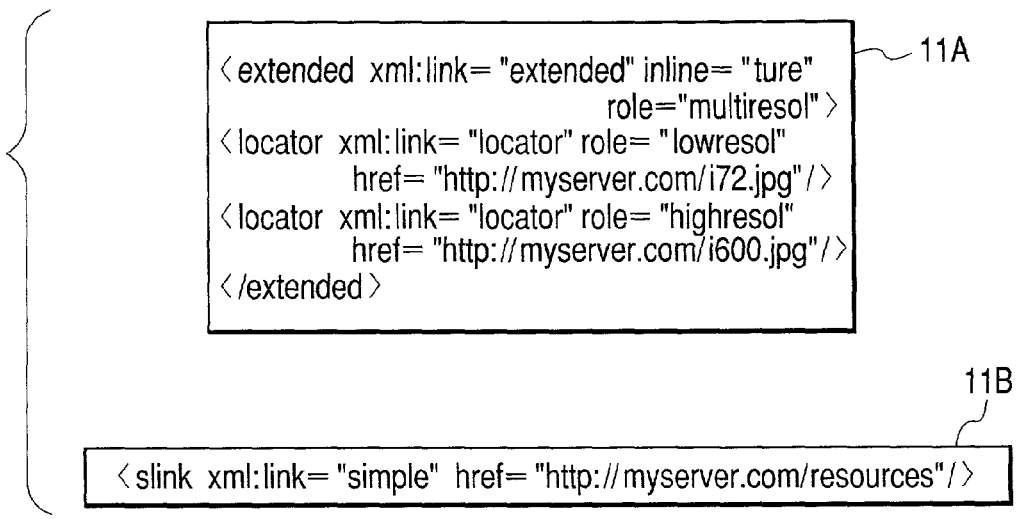
FIG. 5 is a view showing one example of a locator of a structured description document data processed in a printing system.

FIG. 5 is a diagram showing one example of the locator for the structured description language that is processed by the printing system according to the invention, in which the difference between the extended link and simple link is shown.

In FIG. 5, reference numeral 11a denotes an example of the locator for the structured description document described in the XML. The tags in the first, second and seventh lines indicate that there are a plurality of link destinations for one link. Such a link is typically called the extended link. Reference numeral 11b denotes the simple link that designates only one resource of "resources", which is the simplest one-to-one link.

The locator in the third and fourth lines indicates that the link destination is a resource of "i72. jpg" when a condition "lowresol" holds.

The locator in the fifth and sixth lines indicates that the link destination is a resource of "i600. jpg" when a condition "highresol" holds. With such descriptions, a plurality of resources that are different depending on the conditions can be specified for one link in the document described in the structured description language.

Figure 6:
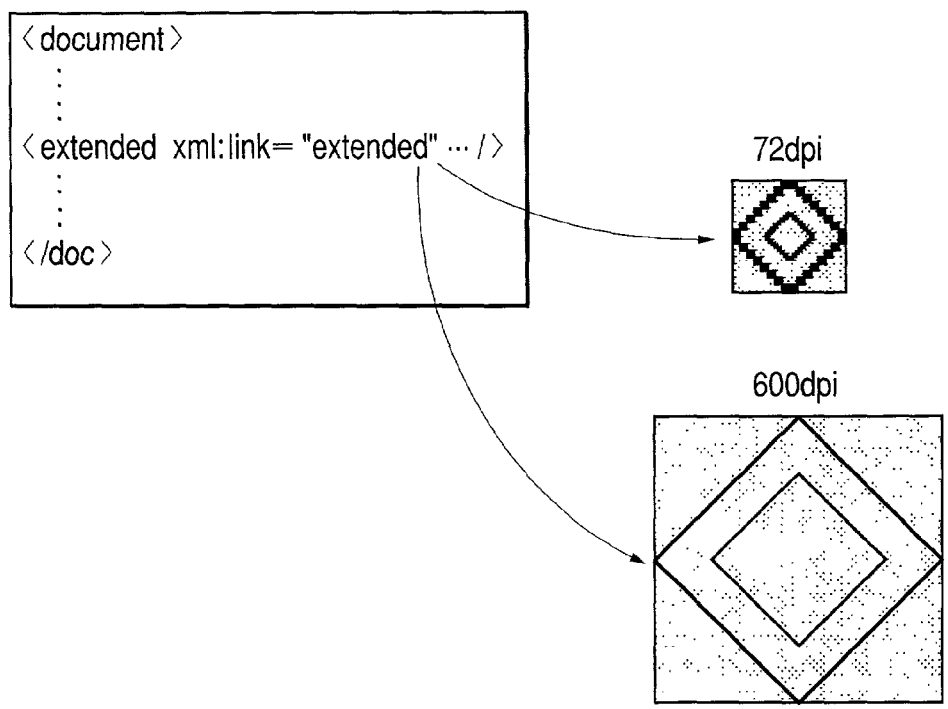
FIG. 6 is a view for explaining the concept of a locator with an extension link and an extension link.

FIG. 6 is a diagram for explaining the concept of the locator/extended link with the extended link 11a as shown in FIG. 5. In FIG. 6, both the image data of 72 dpi and the image data of 600 dpi are linked to the same location in the document described in the structured description language. A portion beginning with <extended . . . is described as shown in FIG. 5.

In the printing system comprising the print control device and the server device configured in the above way, an overall print control processing procedure in this embodiment will be described below by reference to the flowcharts as shown in FIGS. 7 to 10.

Figure 7:
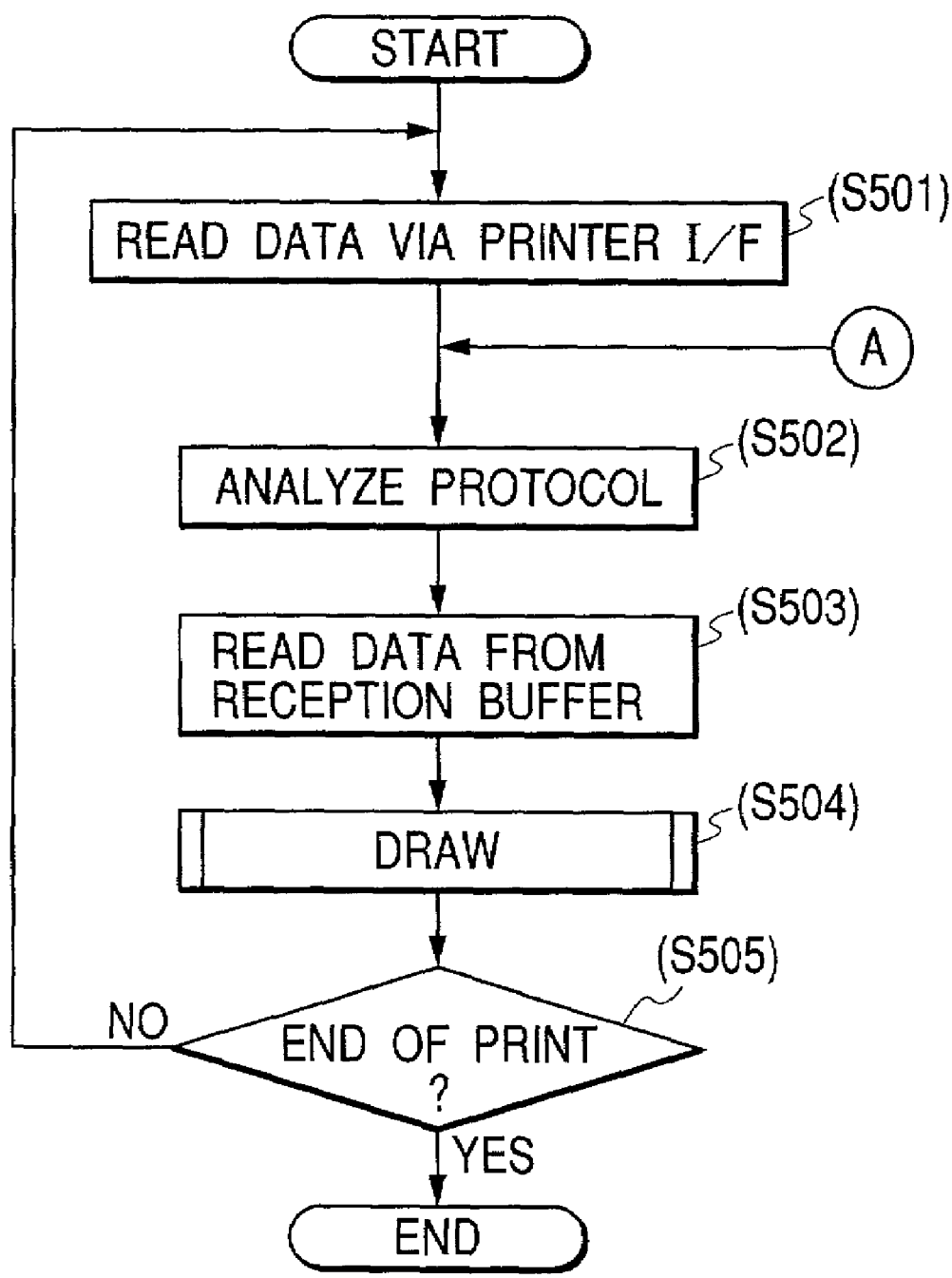
FIG. 7 is a flowchart showing one example of a first data processing procedure in the print control device.

FIG. 7 is a flowchart showing one example of a first data processing procedure in the print control device according to the invention. This first data processing procedure corresponds to a main processing procedure from the start to end of operation of the printer 1000 as shown in FIG. 3. S501 to S505 indicate the steps.

First of all, at step S501, the data is received through the printer interface 1200 from the network. Then, at step S502, the protocol is analyzed, and at step S503, the data is read from a reception buffer (on the RAM within the printer 1000 as shown in FIG. 3). The reception buffer is storage means for saving temporarily the data from the outside.

At step S504, a drawing process is performed. Then, at step S505, it is checked whether or not the document data is ended. If the document data is ended, the printing operation is completed.

On the other hand, if the document data is not ended at step S505, the processing from step S501 is repeated.

Figure 8:
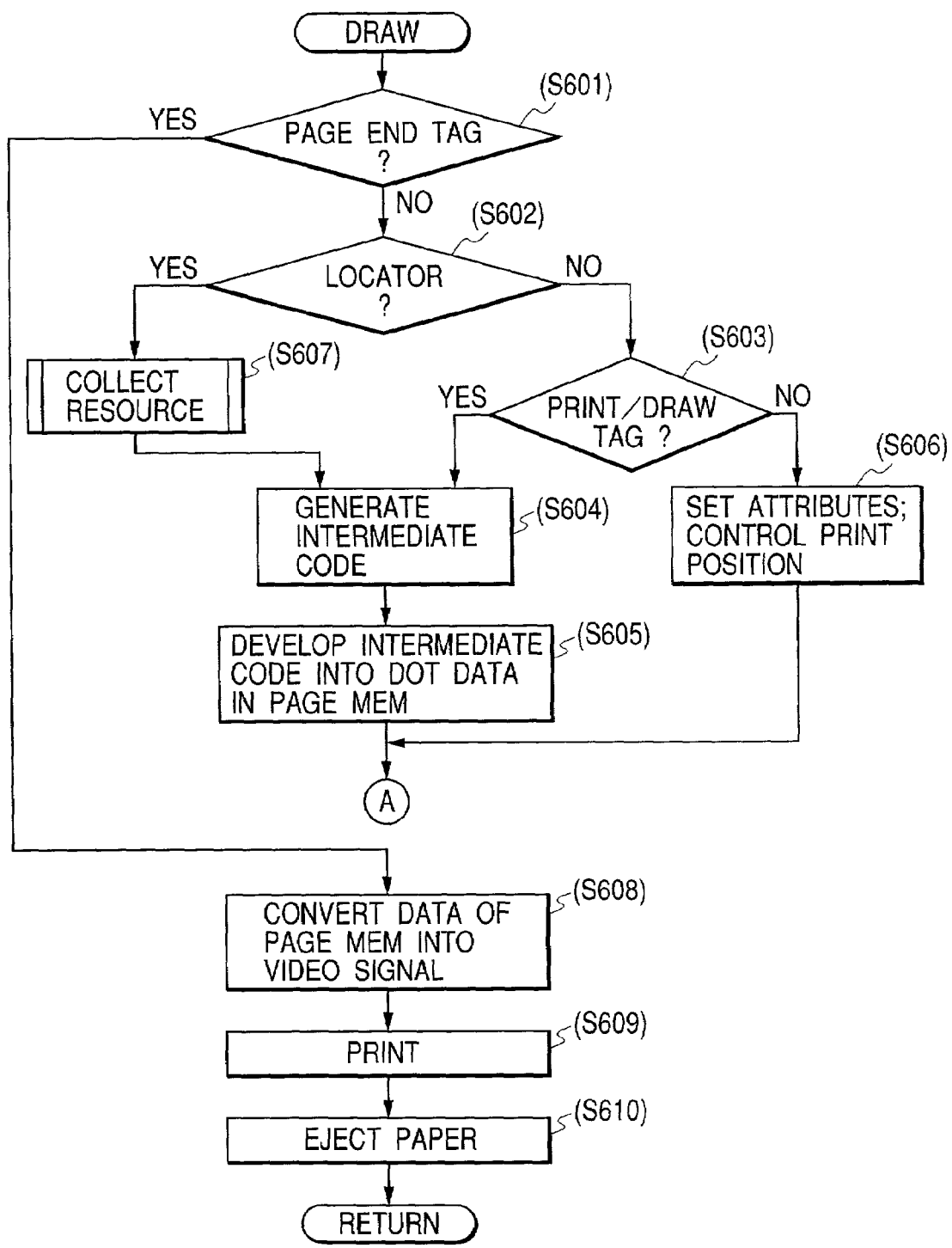
FIG. 8 is a flowchart showing one example of a second data processing procedure in the print control device.

FIG. 8 is a flowchart showing one example of a second data processing procedure in the print control device according to the invention, which corresponds to a detailed procedure of the drawing process (i.e., practical printing process) as indicated at step S504 in FIG. 7. S601 to S610 indicate the steps.

First of all, it is checked at step S601, whether or not a page end tag is judged in the document data analyzer 1103. If the page end tag is judged, the processing from step S608 will be performed.

On one hand, at step S601, if the page end tag is not judged, it is checked at step S602 whether or not the locator. If the locator is judged, the procedure proceeds to step S607 to collect the resources, or if not, goes to step S603.

And at step S603, it is checked whether or not the analyzed tag requires expansion into the page memory 1105. For example, the tag requiring expansion is involved in the character printing or graphics drawing.

If the tag does not require expansion, the procedure goes to step S606 to make processing in accordance with the tag for attribute setting or the tag for print position control, and then to step S502 in FIG. 7.

On the other hand, if the tag requiring expansion is judged at step S603, the procedure proceeds to step S604 to generate the intermediate code that is in easily expandable form into the bit map. At step S604, the intermediate code is generated in accordance with the tag for character printing or the tag for graphics drawing, and on the basis of the resource acquired from the outside. The data drawer 1104 expands the received intermediate code into the page memory 1105 at step S605, and after the end of expansion, the procedure returns to step S502 in FIG. 7 to repeat the analysis process of the document data.

On one hand, at step S601, if the page end tag is judged, the output controller 1300 converts the content of the page memory 1105 into the video signal for the printer engine 1400 and transfers the image at step S608.

At step S609, the printer engine 1400 forms the received video signal as the permanent visible image on the recording sheet. And at step S610, the recording sheet with the printed result is exhausted, and the print control process for one page is ended.

Figure 9:
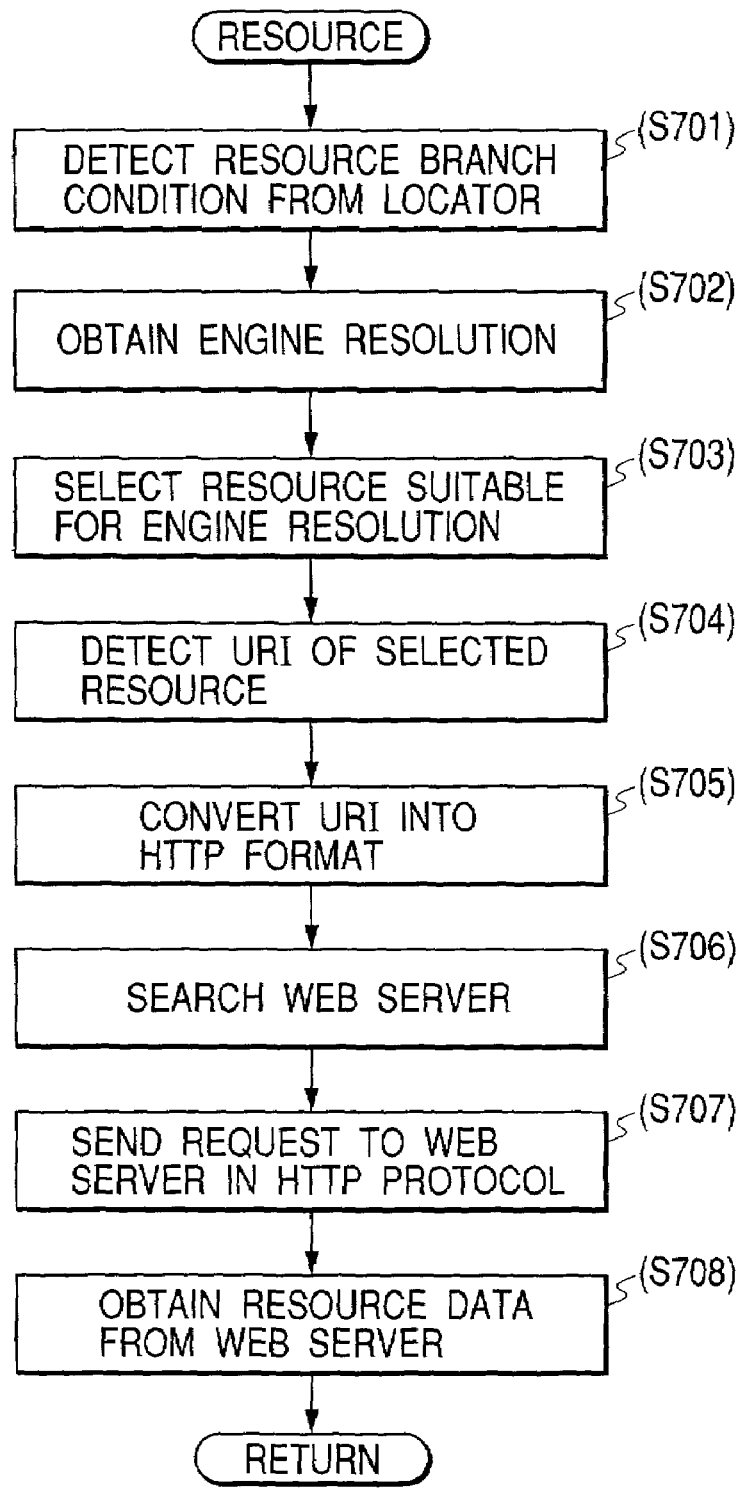
FIG. 9 is a flowchart showing one example of a third data processing procedure in the print control device.

FIG. 9 is a flowchart showing one example of a third data processing procedure in the print control device according to the present invention, which corresponds to a detailed procedure of the resource collecting process (i.e., the process for acquiring the resource linked by the locator) as indicated at step S607 in FIG. 8. S701 to S708 indicate the steps.

First of all, at step S701, the locator is interpreted to detect which conditions are appended to a plurality of resources. In the example as indicated at 11a in FIG. 5, the conditions "lowresol" and "highresol" are appended to the resources "i72. jpg" and "i600. jpg", respectively.

Then, at step S702, the engine resolution is acquired. This processing is to recognize the resolution that is currently effective, because the printer engine 1400 is typically operable on a multiplicity of resolutions, but this processing may be omitted if the printer engine has only one resolution.

Then, at step S703, the corresponding resource is selected by comparing the conditions detected at step S701 with the engine resolution acquired at step S702. According to an example shown in 11A of FIG. 5, in the case when the engine resolution indicates a high value, it is judged that the condition "highressol" is satisfied, and consequently "i600. jpg" is selected.

Then, at step S704, the URI of selected resource is detected. In the example as indicated at 11a in FIG. 5, http://myserver.com/i600. jpg is the URI of selected resource.

Then, at step S705, the detected URI is converted into the HTTP format. If the preparation for transmitting information from the printer 1000 is made by the above processing steps, the subsequent processing steps involve the communication in accordance with the HTTP protocol.

At step S706, the Web server corresponding to the URI is retrieved, and at step S707, a request is transmitted to the Web server 2000 in accordance with the HTTP protocol. Namely, a request for the data indicated by the URI is transmitted to the Web server and the data is acquired from the Web server.

At step S708, the data transferred from the Web server 2000 is received. Thus, the procedure is ended.

Figure 10:
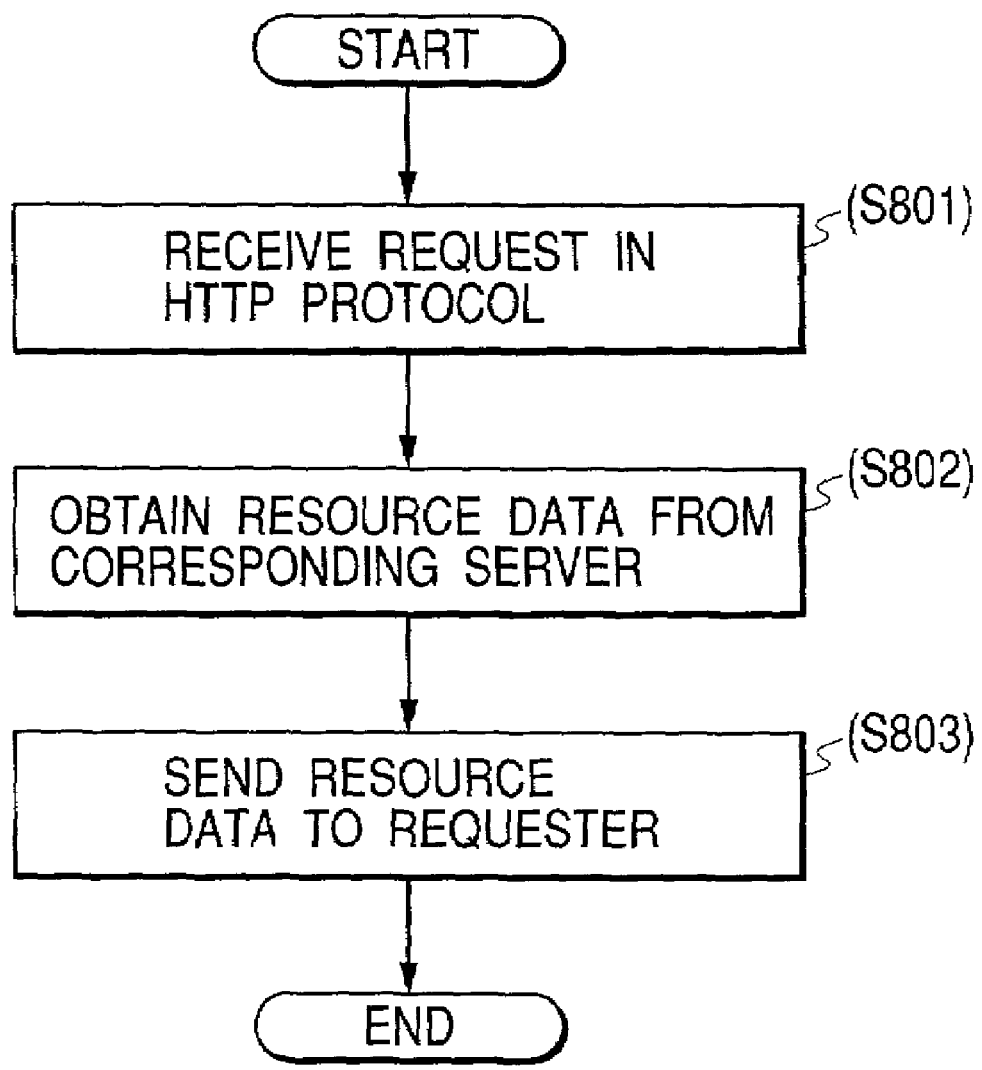
FIG. 10 is a flowchart showing one example of a first data processing procedure in a server device.

FIG. 10 is a flowchart showing one example of a first data processing procedure in the server device according to the present invention, which corresponds to the main processing procedure from the start to end of the operation of the Web server 2000 as shown in FIG. 5. S801 to S803 indicate the steps. The Web server in this embodiment 2000 is commonly spread in the Internet, and accordingly the processing steps involve a typical procedure, and will be outlined below.

First of all, at step S801, a request in HTTP protocol is received. At step S802, the resource data is acquired from the server where the resource designated by the URI is stored. Then at step S803, the resource data is transmitted to the requester. Thus the procedure is ended.

Second Embodiment

Though in the first embodiment, the branch condition of locator is detected within the printer 1000, and the resource selected by the printer 1000 is requested to the Web server 2000, the processing of locator is performed on the side of the Web server 2000 in this second embodiment. The second embodiment will be described below by reference to FIG. 5, FIG. 13, FIG. 14 and FIG. 15.

In the first embodiment, 11a in FIG. 5 is embedded into the document described in the structured description language, and the resource acquisition with the conditional branch is performed by the printer 1000. However, the resource acquisition process with the conditional branch may be performed by the Web server 2000.

Specifically, for example, a file containing the description of 11a may be stored in the resource server 2005 with a name of "resources", and the description as indicated at 11a in FIG. 5 may be embedded into the document data described in the structured description language. The link 11b only designates one resource "resources", which is the simplest one-to-one link.

Figure 11:
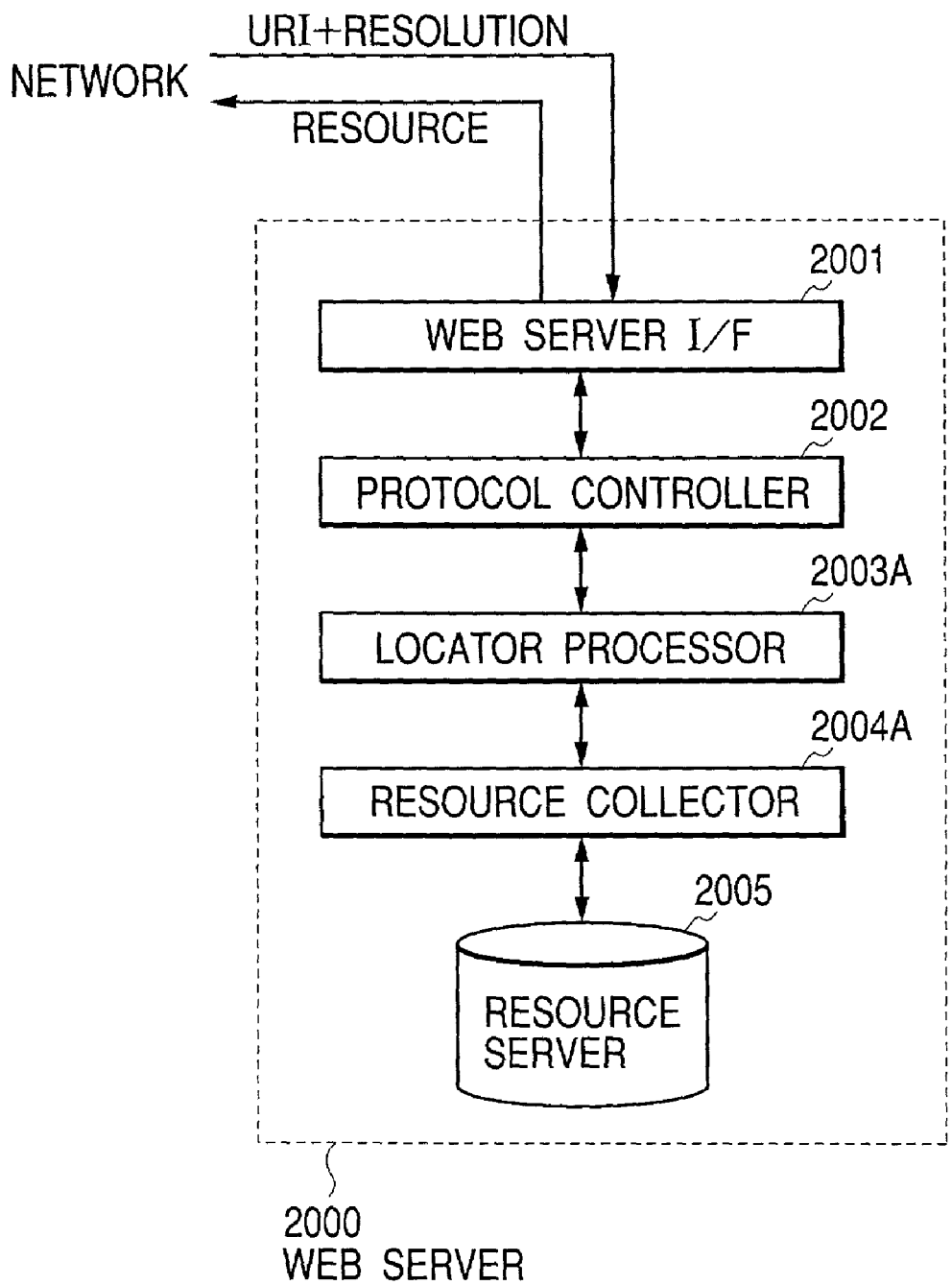
FIG. 11 is a block diagram for explaining a configuration of the server device (Web server)

FIG. 11 is a block diagram for explaining the configuration of the server device (Web server) according to the second embodiment of the invention. The same or like numerals are attached to the same parts as in FIG. 4. The constitution of the printer 1000 is the same as in FIG. 3, and is not described here. However, the processing steps are different and will be described later.

In FIG. 11, a Web server 2000 is roughly composed of a Web server interface 2001, a protocol controller 2002, a locator processor 2003A, a resource collector 2004A, and a resource server 2005.

The Web server interface 2001 has a function for making the input or output into or from the outside. The protocol controller 2002 has a function for making the communications with the outside by analyzing and transmitting a network protocol. For example, when the HTTP is used for the protocol, it receives the information and transmits the resource indicated by the URI.

The locator processor 2003A has a function for extracting the URI of necessary resource by analyzing a group of tags for the locator. The resource collector 2004A has a function for acquiring the designated resource from the resource server 2005. The resource server 2005 stores a resource file of the document data described in the structured description language. If receiving the URI and resolution from the printer 1000, the Web server 2000 takes out the resource designated by the URI from the resource server 2005, analyzes the locator within the designated resource, selects the resource adaptive to the resolution, and transmits the resource to the printer 1000 in the protocol communication.

A network such as the Internet is employed to connect between the printer 1000 and the Web server 2000 in the same manner as in the first embodiment.

Figures 12, 13:
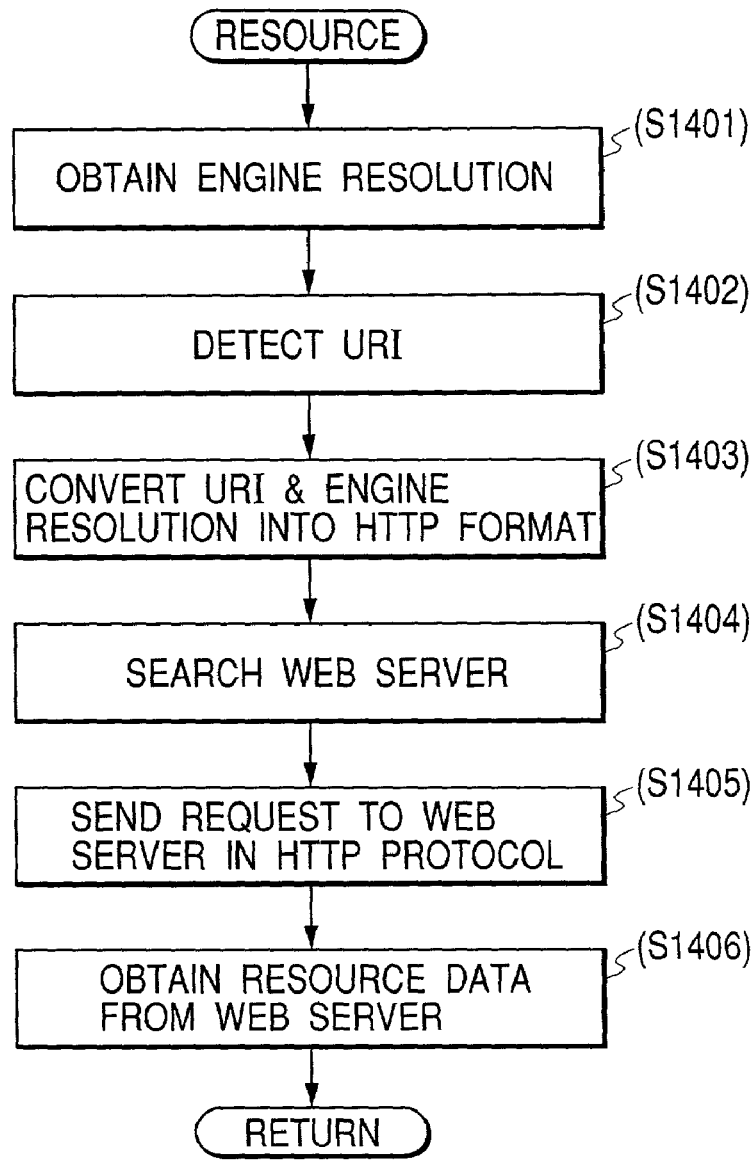
FIG. 12 is a flowchart showing one example of a fourth data processing procedure in the print control device.
FIG. 13 is a diagram showing an example of HTTP format conversion in a resource acquiring process in the print control device.
Figure 14:
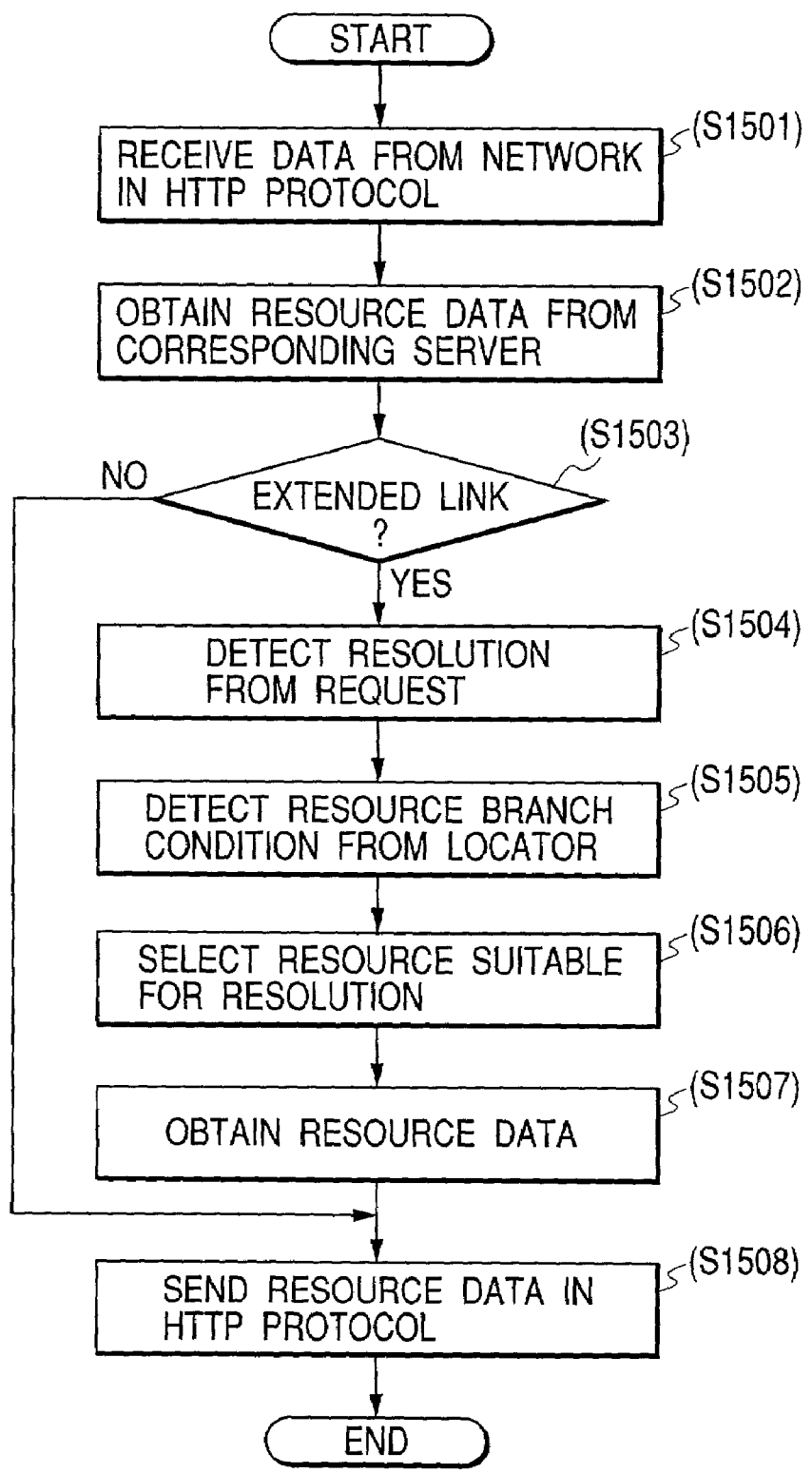
FIG. 14 is a flowchart showing one example of a second data processing procedure in the server device.

In the printing system configured in the above way, an overall print control processing procedure in this embodiment will be described below by reference to the flowcharts as shown in FIGS. 12 and 14 and a conversion example into the HTTP format as shown in FIG. 13. The main process and the drawing process of the printer 1000 are the same as shown in FIGS. 7 and 8 in the first embodiment, and is not described here.

FIG. 12 is a flowchart showing one example of a fourth data processing procedure in the print control device according to the invention. This fourth data processing procedure corresponds to a second resource acquisition process (i.e., a process for acquiring the resource linked by the locator) in the printer 1000. S1401 to S1406 indicate the steps.

First of all, at step S1401, the engine resolution is acquired. This processing is to recognize the resolution that is currently effective, because the printer engine 1400 is typically operable on a multiplicity of resolutions, but this processing may be omitted if the printer engine has only one resolution.

Then, at step S1402, the URI of resource is detected. In the example as shown in FIG. 5, http://myserver.com/resources of the link 11b is the URI of resource.

Then, at step S1403, the detected URI and resolution are converted into the HTTP format. A specific conversion example into the HTTP format is shown in FIG. 13.

FIG. 13 is a diagram showing an HTTP format conversion example through the resource acquisition process in the print control device according to the invention, in which the URI and resolution are converted into a request line in the HTTP protocol, with the resolution of "600" (dpi) specified.

If the preparation for transmitting information from the printer 1000 is made by the above processing steps, the subsequent processing steps involves the communication process in accordance with the HTTP protocol in the same manner as in the first embodiment.

At step S1404, the Web server designated by the URI is retrieved, and at step S1405, a request is transmitted to the Web server in accordance with the HTTP protocol. And at step S1406, the data transferred from the Web server 2000 is received (acquired). Thus, the procedure is ended.

FIG. 14 is a flowchart showing one example of a second data processing procedure in the server device according to the present invention, which corresponds to the main processing procedure from the start to end of the operation of the Web server 2000 in the second embodiment. S1501 to S1503 indicate the steps.

First of all, at step S1501, the data is received in the HTTP protocol from the network. This processing is performed in the Web server interface 2001.

At step S1502, the resource data is acquired from the server where the designated resource is stored. Then at step S1503, it is checked whether or not the acquired resource is a file containing the extended link as indicated at link 11a in FIG. 5. If it is judged that the file doesn't contain any extended link, the procedure goes to step S1508. If it is judged that the file contains the extended link, the procedure goes to step S1504. At step S1504, the resolution is detected from the request notified in the HTTP protocol.

Then, at step S1505, the locator is interpreted to detect which conditions are appended to the resources described by the locator. In the example as indicated at link 11a in FIG. 5, the conditions "lowresol" and "highresol" are appended to the resources "i72. jpg" and "i600. jpg", respectively.

Then, at step S1506, the detected resolution is compared with the condition, and a resource having the coincident or nearest resolution is selected. If the detected resolution indicates 600 dpi, "i600. jpg" corresponding to a condition of "highresol" representing the higher resolution is selected in the example as indicated at link 11a in FIG. 5.

Then at step S1507, the selected resource is acquired, and at step S1508, the resource data is transmitted in the HTTP protocol communication to the outside. Thus, the procedure is ended.

On the other hand, if the description file with the extended link is not judged at step S1503, the procedure directly goes to step S1508 to transmit the resource data. Thus, the procedure is ended.

Third Embodiment

In the first and second embodiments as described above, the resource corresponding to the resolution of the printer 1000 is selected. However, the resource may be selected depending on whether the printer 1000 is a color printer or a monochrome printer.

Thus, a process for acquiring a resource corresponding to an operating color mode of the printing device by linking different color modes to corresponding resources, and an exceptional process that is taken when there is no corresponding resource will be set forth below by reference to FIGS. 15 to 18. First of all, the whole print control processing procedure in the third embodiment will be described by reference to FIG. 16, FIG. 17 and FIG. 18 in a flowchart shown in FIG. 15.

Figure 15:
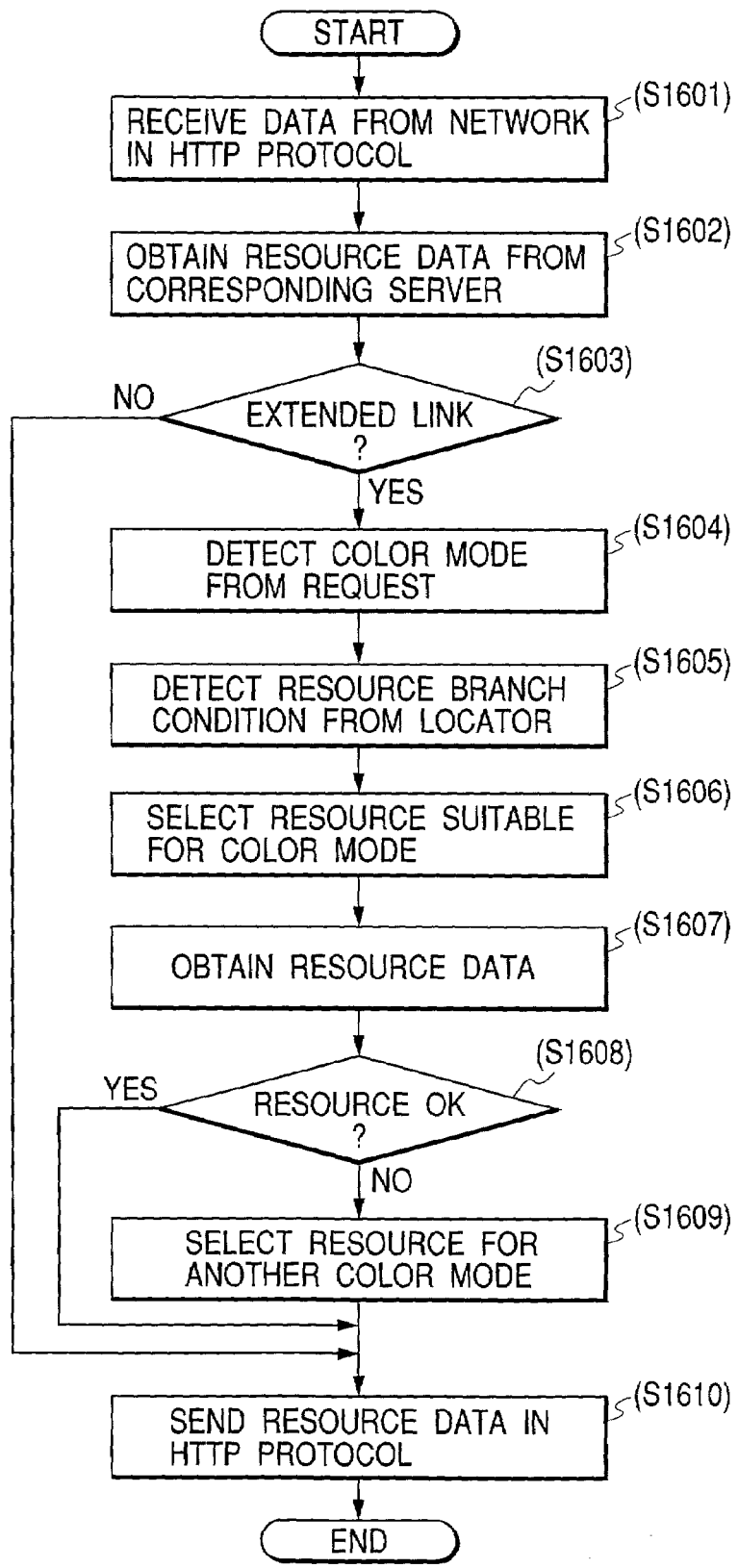
FIG. 15 is a flowchart showing one example of a third data processing procedure in the server device.

FIG. 15 is a flowchart showing one example of a third data processing procedure in the server device according to the present invention, which corresponds to the main processing procedure from the start to end of the operation of the Web server 2000. S1601 to S1610 indicate the processing steps.

First of all, at step S1601, the data is received in the HTTP protocol from the network. This processing is performed in the Web server interface 2001.

Figures 16, 17, 18:
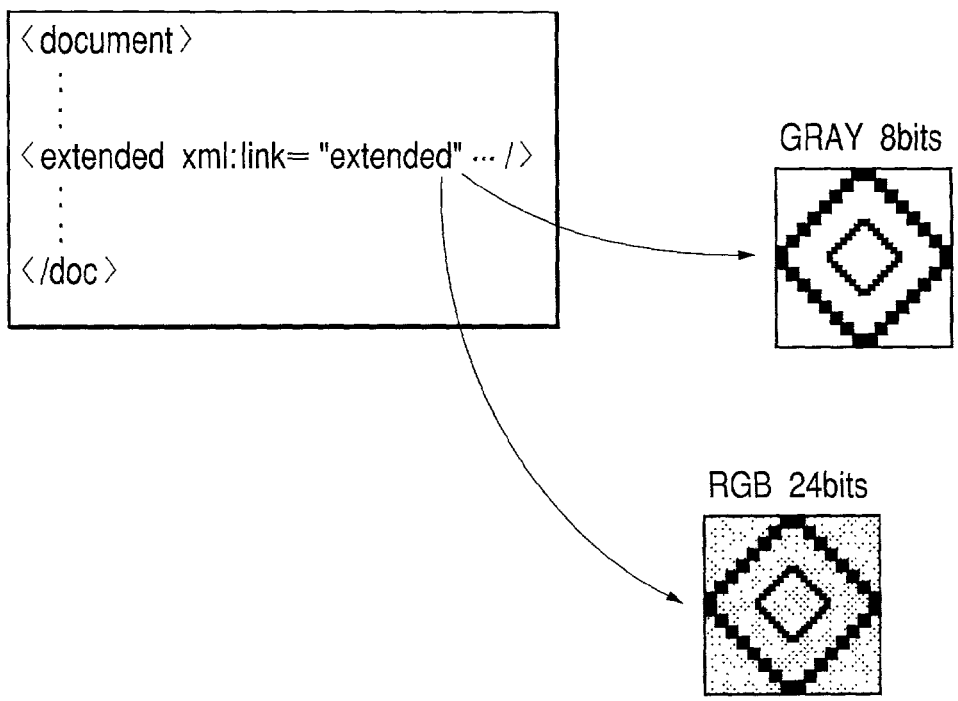
FIG. 16 is a view for explaining the concept of the extension link analyzed by the server device.
FIG. 17 is a diagram showing one example of a color mode which the server device accepts from the other server device.
FIG. 18 is a view showing one example of a locator for the structured description document data processed in a printing system.
Figure 20:
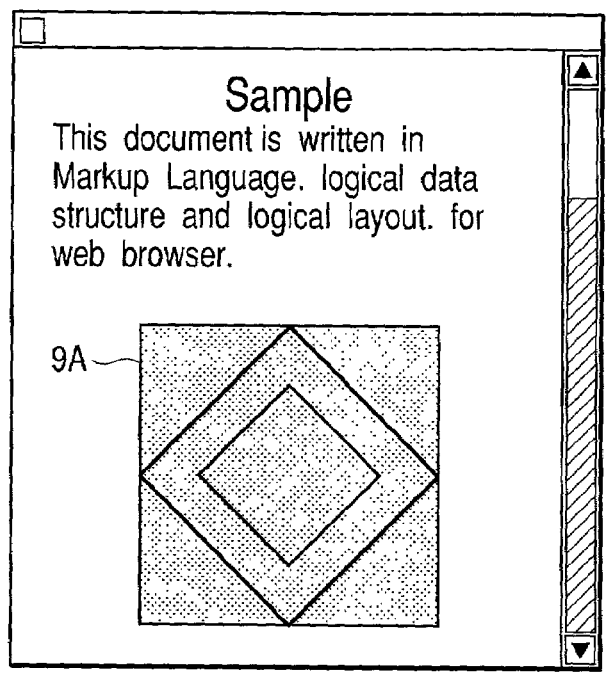
FIG. 20 is a view for explaining a display state of document and image in an ordinary display device.
Figure 21:
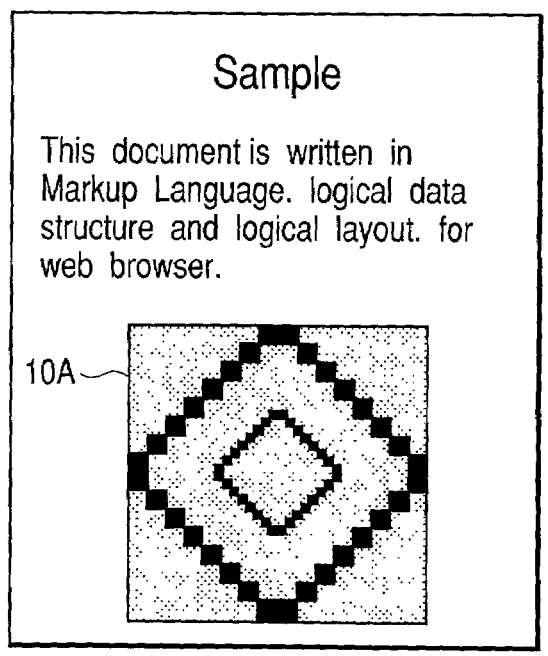
FIG. 21 is a view for explaining a print result of document and image in a typical printing device.

At step S1602, the resource data is acquired from the server where the designated resource is stored. Then at step S1603, it is checked whether or not the acquired resource is a file containing the extended link as indicated in FIG. 16. If the file does not contain the extended link, the procedure goes to step S1610. On one hand, at step S1603, if the acquired resource is the file containing the extended link, the procedure proceeds to step S1604.

FIG. 16 is a view showing a file containing the extended link. In this case, both the 8-bit gray scale image data and the 24-bit RGB full color image data are linked from the same location in the document data described in the structured description language. Specifically, the tags as shown in FIG. 18 are described. In an example of FIG. 18, the conditions "monochrome" and "fullcolor" are appended to the resources "mono.jpg" and "color.jpg", respectively. Namely, if the printer is monochrome, the resource "mono.jpg" is acquired, while if the printer is fullcolor, the resource "color.jpg" is acquired. The constitution and operation of the printing device in this third embodiment are the same as in the second embodiment, and not described here.

At step S1604, the color mode is detected from a request notified in the HTTP protocol. FIG. 17 is a diagram showing a specific example of the request notified in the HTTP protocol. In the request of FIG. 17, it is indicated that the printer 1000 is the full color printer (colormode=fullcolor).

Then, at step S1605, the locator is interpreted to detect the branch condition. Further, at step S1606, the resource corresponding to the color mode detected at step S1604 is selected. For example, if the color mode detected at step S1604 is "fullcolor", "color.jpg" is selected.

Then, at step S1607, the selected resource is acquired from the server. At step S1608, it is checked whether or not the acquisition of the resource is succeeded. If succeeded, the procedure proceeds to step S1610, where the acquired resource data is transmitted in the HTTP protocol communication to the outside. Thus, the procedure is ended.

On the other hand, at step S1608, if the acquisition of resource fails, the procedure goes to step S1609. The failure in the acquisition of resource occurs when the resource is not stored, or an error is returned from the resource server due to a trouble on the resource server.

And if the acquisition of resource fails, the resource in another color mode is reselected at step S1609. Namely, if the acquisition of "color.jpg" selected at step S1606 fails, another resource "mono.jpg" is selected and acquired. Then the procedure proceeds to step S1610 to transmit the resource data to the outside. Thus, the procedure is ended.

On one hand, if the resource acquired at step S1603 is not a description file of the extended link, the procedure proceeds directly to step S1610 to transmit the resource data.

Though in the first embodiment, the resource server is a component of the Web server, the resource server may be placed outside. For example, it may be a hard disk in other personal computer.

Though in the first embodiment, the resource is acquired from the resource server via the network, the resource stored in the printing device may be utilized.

For example, if the printing device is equipped with a secondary storage unit, the resource once acquired may be cached in the secondary storage unit, whereby if the same resource is designated, it can be taken out from the secondary storage unit.

Though in the second and third embodiments, the resolution or the color mode is notified in the HTTP protocol, other protocols may be employed so far as they can notify such information.

Though in the second embodiment, the resolution notified in the HTTP protocol uses a specific numerical value, the meaning such as "highresol" may be specified if the resource can be selected on the Web server.

Though in the above embodiments, the branch conditions of resource involve the use of the resolution and the color mode, the combination of resolution and color mode may be used as the branch condition. For example, an optimal resource can be acquired by specifying monochrome and 600 dpi.

Though in the above embodiments, the image data is employed as the resource, the resource is not limited to the image data if the resource should be branched by the resolution or the color mode. For example, a solid pattern or dither pattern should be branched in the same way to get the more beautiful printed result. Though in the above embodiments, the XML is employed for the description of locator, it is needless to say that the data description form is not limited to the XML so far as it can implement the one-to-many link.

A printing system, for example, can be implemented from the image processing apparatus having each means and the server device according to the invention, and the image processing apparatus capable of performing each step and the server device within the applicable range of the invention.

The configuration of a data processing program that can be read in the printing system having the print control device and the server device according to the present invention will be described below by reference to a memory map of FIG. 19.

FIG. 19 is a diagram for explaining a memory map of a storage medium storing various kinds of data processing programs which can be read in the printing system having the print control device and the server device according to the present invention.

The management information for a group of programs stored in the storage medium, for example, version information and creator name, is also stored, and the information depending on the OS on the program reading side, for example, icon for identifying and displaying the program, may be stored.

Further, the data dependent upon various sorts of programs is also managed in the directory. Also, a program for installing various sorts of programs in the computer or a program for decompressing the program that is compressed may be stored.

The functions as shown in FIGS. 7 to 10 and FIGS. 12, 14 and 15 in this third embodiment may be installed by an external program in the host computer. In this case, the information group including the program may be supplied to the output device externally employing the storage medium such as CD-ROM, flash memory or FD, or via the network in this invention.

As described above, the storage medium storing the program code of software that can implement the functions of the above embodiments is supplied to the system or apparatus, and the computer (or CPU or MPU) for the system or apparatus reads the program code stored in the storage medium and executes it, whereby the objects of the invention can be achieved.

In this case, the program code itself read from the storage medium will implement new functions of the invention, and the storage medium storing the program code constitutes the invention.

Examples of the storage medium for supplying the program code include a floppy disk, a hard disk, an optical disk, an optical magnetic disk, CD-ROM, CD-R, a magnetic tape, a non-volatile memory card, ROM, and EEPROM.

On the computer, the read program code may be executed to implement the functions in the above embodiments, or the OS (Operating System) operating on the computer may perform a part or all of the actual processing in accordance with an instruction of the program code to implement the functions in the above embodiments.

Further, after the program code read from the storage medium may be written into a function extension board inserted into the computer or the memory provided in a function extension unit connected to the computer, the CPU in the function extension board or function extension unit may perform a part or all of the actual processing in accordance with an instruction of the program code to implement the functions in the above embodiments.

As described above, with the invention, a suitable resource is selected from among the conditional branch conditions linked in the document information in accordance with an image processing capacity value, and the selected resource or the roughly selected resource is acquired from any of the server devices, whereby the optimal resource for the output capacity of output means on the image processing apparatus side can be collected without increasing the resource selection processing load on the server device side, and the document information and the image information linked in the document information can be output in high quality by making the best use of the capacity of the output means.

Also, the image processing capacity value and the link information acquired by analysis are notified to a server device, and the notified server device acquires the resource corresponding to the image processing capacity value, whereby the optimal resource for the output capacity of output means on the image processing apparatus side can be collected without increasing the resource selection processing load on the image processing apparatus, and the document information and the image information linked in the document information can be output in high quality by making the best use of the capacity of the output means.

Accordingly, there is the superior effect that the capacity of device can be exhibited to the utmost by collecting the resource corresponding to the representation capacity of device, employing the one-to-many link, and the printing system can be constituted at will to perform the printing in high quality and efficiently.

What is claimed is:

1. An image processing apparatus having an output section for outputting an image based on document information described by a predetermined structured description language, comprising:

an analysis section for analyzing a link in the document information described by the structured description language;

a first acquisition section for acquiring resolution of said output section;

a selection section for selecting a resource of which resolution coincides with the resolution acquired by said first acquisition section, in a case where plural resources are linked to one link in the document information analyzed by said analysis section; and a second acquisition section for acquiring the resource selected by said selection section, wherein, in a case where the resource of which resolution coincides with the resolution acquired by said first acquisition section does not exist in the plural resources linked from the one link in the document information analyzed by said analysis section, said selection section selects a resource of which resolution is closest to the resolution acquired by said first acquisition section.

2. The image processing apparatus according to claim 1, wherein the document information is described in XML.

3. The image processing apparatus according to claim 1, wherein said output section is a printer device for outputting a permanent visible image onto a recording sheet.

4. An image processing apparatus having an output section for outputting an image based on document information described by a predetermined structured description language, comprising:

an analysis section for analyzing the link in the document information described by the structured description language;

a first acquisition section for acquiring resolution of said output section;

a determination section for determining, based on the resolution acquired by said first acquisition section, whether to select the resource of which resolution is highest or the resource of which resolution is lowest from among plural resources, in a case where the plural resources are linked to one link in the document information analyzed by said analysis section;

a selection section for selecting any one of the plural resources linked from the one link in the document information analyzed by said analysis section, based on a determination result by said determination section; and a second acquisition section for acquiring the resource selected by said selection section.

5. The image processing apparatus according to claim 4, wherein the document information is described in XML.

6. The image processing apparatus according to claim 4, wherein said output section is a printer device for outputting a permanent visible image onto a recording sheet.

7. An image processing method for outputting an image based on document information described by a predetermined structured description language, comprising the steps of:

analyzing a link in the document information described by the structured description language;

acquiring resolution of the output section;

selecting a resource of which resolution coincides with the resolution acquired in said resolution acquiring step, in a case where plural resources are linked to one link in the document information analyzed in said analyzing step; and acquiring the resource selected in said selecting step, wherein, in a case where the resource of which resolution coincides with the resolution acquired in said resolution acquiring step does not exist in the plural resources linked from the one link in document information analyzed in said analyzing step said selecting step selects a resource of which resolution is closest to the resolution acquired in said resolution acquiring step.

8. The image processing method according to claim 7, wherein the document information is described in XML.

9. The image processing method according to claim 7, wherein the output section is a printer device for outputting a permanent visible image onto a recording sheet.

10. An image processing method for outputting an image based on document information described by a predetermined structured description language, comprising the steps of:

analyzing the link in the document information described by the structured description language;

acquiring resolution of the output section;

determining, based on the resolution acquired in said resolution acquiring step, whether to select the resource of which resolution is highest or the resource of which resolution is lowest from among plural resources, in a case where the plural resources are linked to one link in the document information analyzed in said analyzing step;

selecting any one of the plural resources linked from the one link in the document information analyzed in said analyzing step, based on a determination result in said determining step; and acquiring the resource selected in said selecting step.

11. The image processing method according to claim 10, wherein the document information is described in XML.

12. The image processing method according to claim 10, wherein the output section is a printer device for outputting a permanent visible image onto a recording sheet.

13. A computer readable medium, which stores a program for outputting an image based on document information described by a predetermined structured description language, wherein said program enables an image processing apparatus to perform the steps of:

analyzing a link in the document information described by the structured description language;

acquiring resolution of the output section;

selecting a resource of which resolution coincidences with the resolution acquired in said resolution acquiring step, in a case where plural resources are linked to one link in the document information analyzed in said analyzing step; and acquiring the resource selected in said selecting step, wherein, in a case where the resource of which resolution coincides with the resolution acquired in said resolution acquiring step does not exist in the plural resources linked from the one link in the document information analyzed in said analyzing step, said selecting step selects a resource of which resolution is closest to the resolution acquired in said resolution acquiring step.

14. The program according to claim 13, wherein the document information is described in XPL.

15. The program according to claim 13, wherein the output section is a printer device for outputting a permanent visible image onto a recording sheet.

16. A computer readable medium, which stores a program for outputting an image based on document information described by a predetermined structured description language, wherein said program enables an image processing apparatus to perform the steps of:

analyzing the link in the document information described by the structured description language;

acquiring resolution of the output section;

determining, based on the resolution acquired in said resolution acquiring step, whether to select the resource of which resolution is highest or the resource of which resolution is lowest from among plural resources, in a case where the plural resources are linked to one link in the document information analyzed in said analyzing step;

selecting any one of the plural resources linked from the one link in the document information analyzed in said analyzing step, based on a determination result in said determining step; and acquiring the resource selected in said selecting step.

17. The program according to claim 16, wherein the document information is described in XPL.

18. The program according to claim 16, wherein the output section is a printer device for outputting a permanent visible image onto a recording sheet.

* * * * *

UNITED STATES PATENT AND TRADEMARK OFFICE
CERTIFICATE OF CORRECTION

| | |
|---|---|
| PATENT NO. | : 7,268,902 B2 |
| APPLICATION NO. | : 09/947712 |
| DATED | : September 11, 2007 |
| INVENTOR(S) | : Yasuhiro Hino |

It is certified that error appears in the above-identified patent and that said Letters Patent is hereby corrected as shown below:

COLUMN 2:

Line 63, "an" should read --a--.

COLUMN 3:

Line 21, "an extension link and" should be deleted.

COLUMN 10:

Line 22, "involves" should read --involve--.

COLUMN 11:

Line 58, "is" should read --has--.

COLUMN 14:

Line 27, "which" should read --which the--;
Line 45, "which" should read --which the--; and
Line 46, "which" should read --which the--.

COLUMN 15:

Line 2, "which" should read --which the--;
Line 8, "which" should read --which the--;
Line 12, "step" should read --step,--;
Line 13, "which" should read --which the--; and
Line 29, "which" (both occurrences) should read --which the--.

COLUMN 16:

Line 4, "which" should read --which the--;
Line 15, "which" should read --which the--;
Line 17, "The" should read --A computer readable medium, which stores the--;
Line 19, "The" should read --A computer readable medium, which stores the--;
Line 33, "which" (both occurrences) should read --which the--;
Line 43, "The" should read --A computer readable medium, which stores the--; and

UNITED STATES PATENT AND TRADEMARK OFFICE
CERTIFICATE OF CORRECTION

PATENT NO. : 7,268,902 B2 Page 2 of 2
APPLICATION NO. : 09/947712
DATED : September 11, 2007
INVENTOR(S) : Yasuhiro Hino It is certified that error appears in the above-identified patent and that said Letters Patent is hereby corrected as shown below:

Line 45, "The" should read --A computer readable medium, which stores the--.

Signed and Sealed this

Twenty-eighth Day of October, 2008

JON W. DUDAS
*Director of the United States Patent and Trademark Office*